United States Patent
Himukashi

(10) Patent No.: US 11,080,875 B2
(45) Date of Patent: Aug. 3, 2021

(54) SHAPE MEASURING APPARATUS, SHAPE MEASURING METHOD, NON-TRANSITORY COMPUTER READABLE MEDIUM STORING PROGRAM

(71) Applicant: JVC KENWOOD Corporation, Kanagawa (JP)

(72) Inventor: Takashi Himukashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 60 days.

(21) Appl. No.: 16/296,185

(22) Filed: Mar. 7, 2019

(65) Prior Publication Data
US 2019/0295275 A1    Sep. 26, 2019

(30) Foreign Application Priority Data

Mar. 22, 2018 (JP) .............................. JP2018-054347
Mar. 22, 2018 (JP) .............................. JP2018-054348

(51) Int. Cl.
*G06T 7/55* (2017.01)
*G06T 7/73* (2017.01)

(52) U.S. Cl.
CPC .................. *G06T 7/55* (2017.01); *G06T 7/74* (2017.01); *G06T 2207/10016* (2013.01); *G06T 2207/10028* (2013.01)

(58) Field of Classification Search
CPC combination set(s) only.
See application file for complete search history.

(56) References Cited

U.S. PATENT DOCUMENTS

| 6,628,819 B1* | 9/2003 | Huang | G06T 7/579 345/419 |
|---|---|---|---|
| 2010/0066737 A1* | 3/2010 | Liu | G06T 7/251 345/419 |
| 2013/0158970 A1* | 6/2013 | Hof | G16B 5/00 703/11 |
| 2014/0288889 A1* | 9/2014 | Furuya | G06F 30/00 703/1 |
| 2015/0154321 A1* | 6/2015 | Schmidt | B29C 64/386 700/98 |
| 2015/0302587 A1* | 10/2015 | Hirano | H04N 7/18 348/142 |
| 2016/0071318 A1* | 3/2016 | Lee | G06K 9/4609 345/419 |
| 2016/0103934 A1* | 4/2016 | Kao | B33Y 50/00 700/98 |
| 2018/0268616 A1* | 9/2018 | Choi | B29C 64/393 |

FOREIGN PATENT DOCUMENTS

JP    2005-189203 A    7/2005

\* cited by examiner

*Primary Examiner* — Zhiyu Lu
(74) *Attorney, Agent, or Firm* — Procopio, Cory, Hargreaves & Savitch LLP

(57) ABSTRACT

Provided is a shape measuring apparatus, a shape measuring method, and a program that can efficiently measure a three-dimensional shape of an object. The shape measuring apparatus includes an imaging unit, a distance image sensor unit, and a processing apparatus. The imaging unit acquires a two-dimensional image of an object over a plurality of frames. The distance image sensor unit acquires a distance image of the object over the plurality of frames. The processing apparatus detects a feature point of the object from the distance image of each of the plurality of frames and writes the detected feature point in a coordinate system set for the object.

12 Claims, 23 Drawing Sheets

SHAPE MEASURING APPARATUS, SHAPE MEASURING METHOD, NON-TRANSITORY COMPUTER READABLE MEDIUM STORING PROGRAM

CROSS REFERENCE TO RELATED APPLICATION

This application is based upon and claims the benefit of priority from Japanese patent application No. 2018-54347, filed on Mar. 22, 2018, and Japanese patent application No. 2018-54348, filed on Mar. 22, 2018, the disclosure of which are incorporated herein in its entirety by reference.

BACKGROUND

The present disclosure relates to a shape measuring apparatus, a shape measuring method, and a program.

A shape measuring apparatus for acquiring a three-dimensional shape of an object from image information is known. For example, a commonly known method is a method of fixing an object to be measured to a stage or a turning table and combining image data acquired from different points of view using a plurality of measuring apparatuses (see Japanese Unexamined Patent Application Publication No. 2005-189203).

SUMMARY

However, the above-described shape measuring apparatus requires a plurality of measuring apparatuses, and thus there is a problem that the scale of the apparatus becomes large. Further, the posture of the object to be measured is limited by the stage or the turning table, which may make it difficult to measure the shape of the object depending on its shape.

A shape measuring apparatus according to an embodiment includes: an imaging unit configured to acquire a two-dimensional image of an object over a plurality of frames; a distance image sensor unit configured to acquire a distance image of the object over the plurality of frames; and a processing apparatus configured to detect a feature point of the object from the distance image of each of the plurality of frames and write the detected feature point in a coordinate system set for the object.

A shape measuring method according another embodiment includes: acquiring a two-dimensional image of an object over a plurality of frames; acquiring a distance image of the object over the plurality of frames; detecting a feature point of the object from the distance image of each of the plurality of frames; and writing the detected feature point in a coordinate system set for the object.

A non-transitory computer readable medium storing a program according to another embodiment causes a computer to execute: acquiring a two-dimensional image of an object over a plurality of frames; acquiring a distance image of the object over the plurality of frames; detecting a feature point of the object from the distance image of each of the plurality of frames; and writing the detected feature point in a coordinate system set for the object.

According to this embodiment, it is possible to provide a shape measuring apparatus, a shape measuring method, and a program capable of efficiently measuring a three-dimensional shape of an object.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

Figure 1:
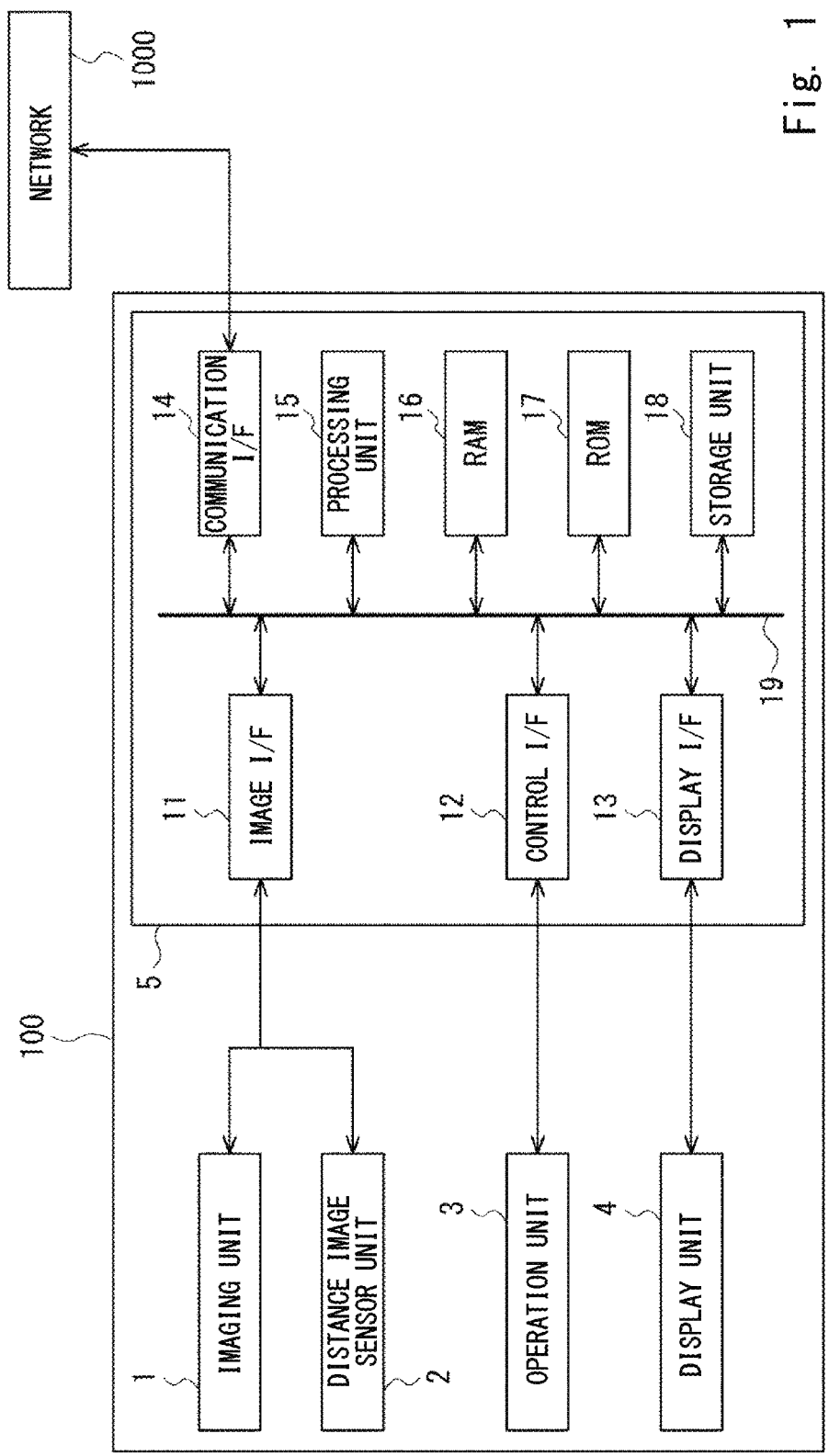
FIG. 1 is a view schematically showing a configuration of a shape measuring apparatus according to a first embodiment.

A shape measuring apparatus according to a first embodiment will be described. FIG. 1 is a view schematically showing a configuration of a shape measuring apparatus 100 according to the first embodiment. The shape measuring apparatus 100 includes an imaging unit 1, a distance image sensor unit 2, an operation unit 3, a display unit 4, and a processing apparatus 5.

The imaging unit 1 is an apparatus that acquires a two-dimensional image of an object whose shape is to be measured (hereinafter referred to as an object 10). The imaging unit 1 is configured as, for example, a camera.

The distance image sensor unit 2 acquires a distance image indicating a distance between the distance image sensor unit 2 and the object 10. Here, the distance image is acquired as three-dimensional point cloud data including coordinates of pixels on a two-dimensional plane and the distances at the coordinates. Thus, in the following descriptions, data elements constituting the point cloud data are referred to as points. For example, a TOF (Time of Flight) camera or an infrared sensor may be used as the distance image sensor unit 2.

The operation unit 3 is used for inputting commands and setting parameters to be given to the shape measuring apparatus 100. Various input devices such as a keyboard, a touch panel, and a mouse can be used as the operation unit 3.

The display unit 4 displays a measurement result and setting information of the shape measuring apparatus 100. Various display devices such as a liquid crystal display and a touch panel can be used as the display unit 4.

The processing apparatus 5 is configured to be able to detect a shape of the object 10 from the two-dimensional image acquired by the imaging unit 1 and the distance image acquired by the distance image sensor unit 2. The processing apparatus 5 is configured using hardware resources such as a computer.

The processing apparatus 5 includes an image interface (I/F) 11, a control I/F 12, a display I/F 13, a communication I/F 14, a processing unit 15, a RAM (Random Access Memory) 16, a ROM (Read Only Memory) 17, a storage unit 18, and a bus 19.

The two-dimensional image acquired by the imaging unit 1 is stored in, for example, the RAM 16 via the image I/F 11 and the bus 19. Distance information acquired by the distance image sensor unit 2 is stored in, for example, the RAM 16 via the image I/F 11 and the bus 19.

Input information such as a command is given to, for example, the processing unit 15 from the operation unit 3 via the control I/F 12 and the bus 19.

The processing unit 15 controls a shape measuring operation of the shape measuring apparatus 100 and performs arithmetic processing related to shape measurement. The processing unit 15 outputs display information such as the measurement result to the display unit 4 via the display I/F 13 and the bus 19. The processing unit 15 is capable of bidirectional communication with an external network 1000 via the communication I/F 14 and the bus 19. A configuration and processing of the processing unit 15 will be described later.

The ROM 17 stores information used by the processing unit 15. The ROM 17 stores, for example, parameters used for the processing of the processing unit 15, and programs executed by the processing unit 15.

The storage unit 18 stores, for example, the result of the shape measurement in the shape measuring apparatus 100 and image data after the measurement processing is completed. When the capacity of the RAM 16 is not enough, the storage unit 18 may store information which should be written in the RAM 16 on behalf of the RAM 16. Various storage media such as a hard disk can be used as the storage unit 18.

Figure 2:
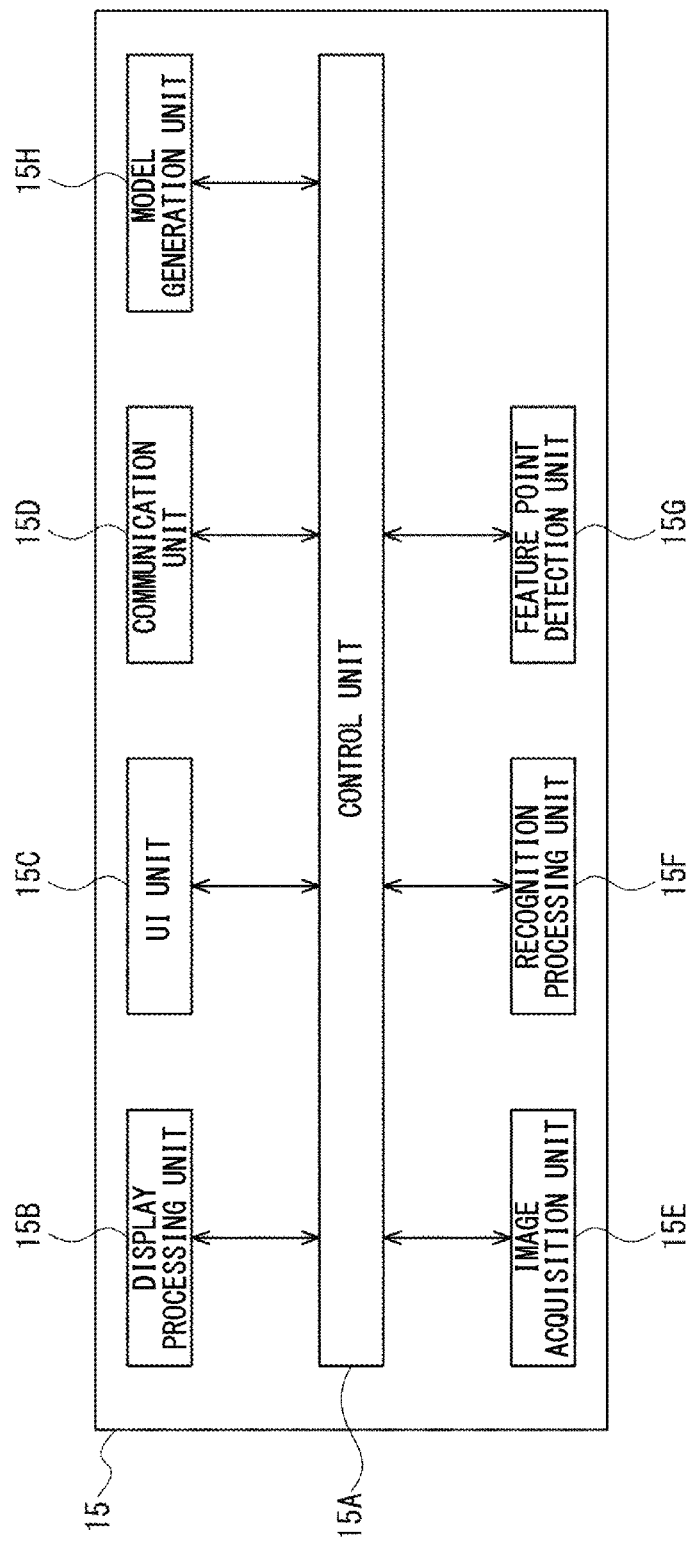
FIG. 2 is a view schematically showing a configuration of a processing unit according to the first embodiment.

FIG. 2 schematically shows a configuration of the processing unit 15 according to the first embodiment. The processing unit 15 includes a control unit 15A, a display processing unit 15B, a user interface (UI) unit 15C, a communication unit 15D, an image acquisition unit 15E, a recognition processing unit 15F, a feature point detection unit 15G, and a model generation unit 15H.

The control unit 15A controls operations of the display processing unit 15B, the UI unit 15C, the communication unit 15D, the image acquisition unit 15E, the recognition processing unit 15F, the feature point detection unit 15G, and the model generation unit 15H.

The display processing unit 15B outputs information which should be displayed to the display unit 4 via the display I/F 13.

The UI unit 15C receives input information such as a command from the operation unit 3 via the control I/F 12 and transfers it to the control unit 15A. The communication unit 15D communicates with the external network 1000 via the communication I/F 14.

The image acquisition unit 15E can sequentially read the two-dimensional image acquired by the imaging unit 1. The image acquisition unit 15E may read, from the RAM 16 or the storage unit 18, the two-dimensional image acquired by the imaging unit 1 and stored in the RAM 16 or the storage unit 18. The image acquisition unit 15E can sequentially read the distance image acquired by the distance image sensor unit 2. The image acquisition unit 15E may read, from the RAM 16 or the storage unit 18, the distance image acquired by the distance image sensor unit 2 and stored in the RAM 16 or the storage unit 18.

The recognition processing unit 15F detects an area corresponding to the object 10 from the read two-dimensional image and distance image.

The feature point detection unit 15G detects a feature point from the image of the object 10 using the distance image processed by the recognition processing unit 15F. The feature point detection unit 15G writes the detected feature point in, for example, the RAM 16.

The shape measuring apparatus 100 according to this embodiment acquires the two-dimensional image and the distance image over a plurality of frames and detects the feature points of the object 10 for each frame while the object 10 is rotated. Then, the feature points are pattern-matched between different frames, and a newly detected feature point is sequentially added. In this manner, the feature points for identifying a three-dimensional shape of the object 10 can be detected using the plurality of frames.

Further, the shape measuring apparatus 100 according to this embodiment saves the feature points using a coordinate system set for the object 10. In order to do so, the shape measuring apparatus 100 according to this embodiment detects a movement of the object 10 between the frames and makes the coordinate system for the object 10 follow the movement. By doing so, the coordinate system set for the object 10 can follow a change in the posture of the object 10 even when the posture of the object 10 changes.

Figure 3:
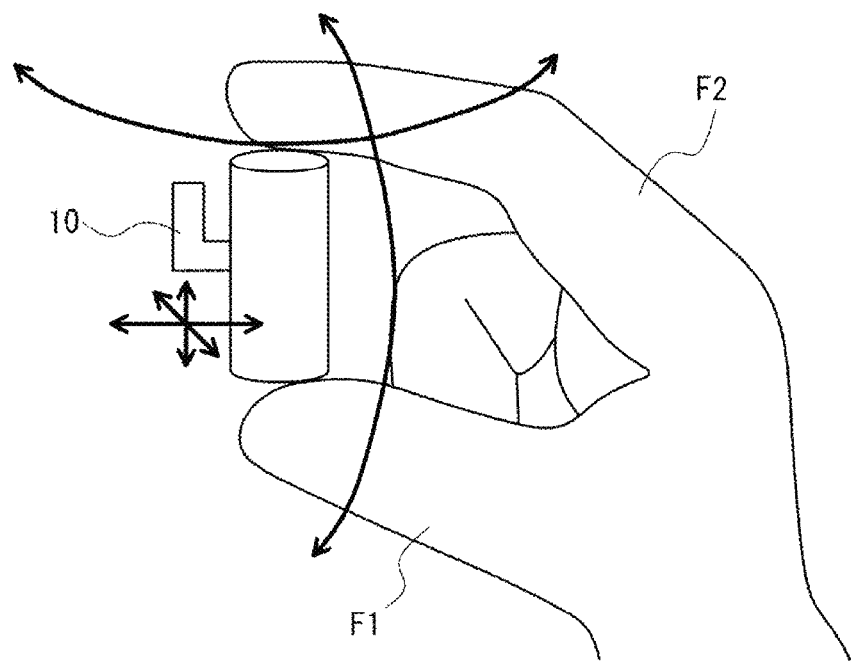
FIG. 3 is a view showing an example of holding an object according to the first embodiment.

In this embodiment, the object 10 is held by a user's hand, a holding member, or the like. FIG. 3 shows an example in which the object 10 is held according to the first embodiment. As shown in FIG. 3, the object 10 is held between, for example, the user's thumb F1 and forefinger F2. A two-dimensional image and a distance image can be acquired over a plurality of frames while the user is moving and rotating the object 10 by changing a holding position of the target 10.

Figure 4:
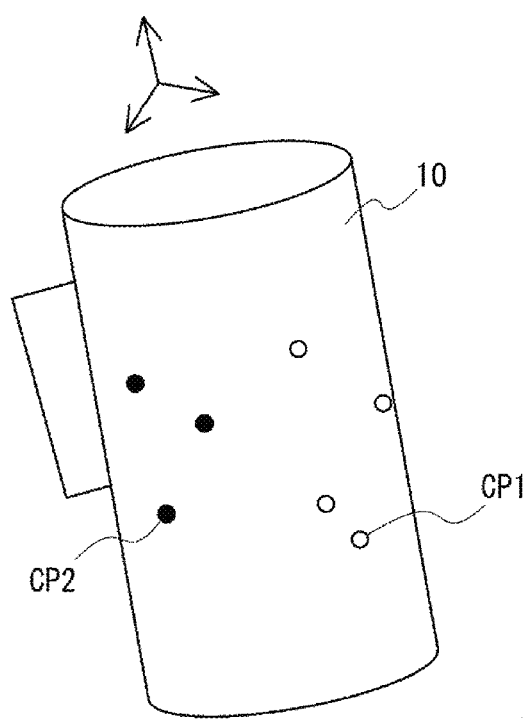
FIG. 4 is a view showing feature points of the object in a first frame.
Figure 5:
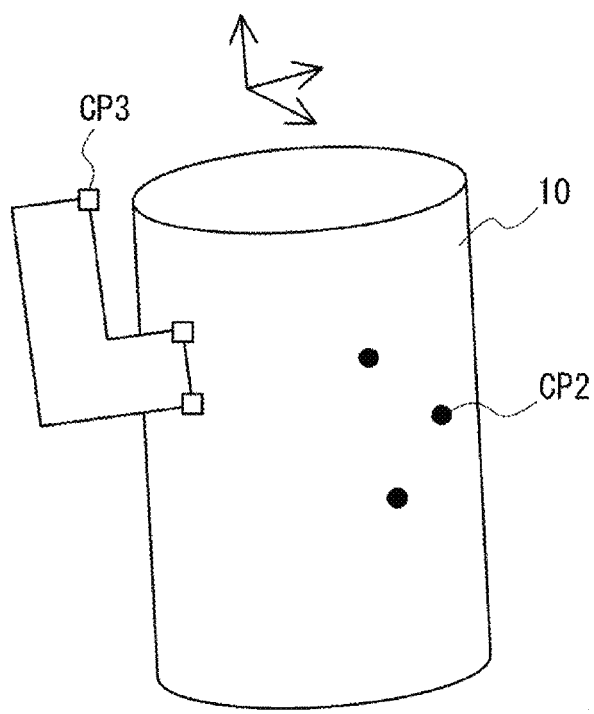
FIG. 5 is a view showing feature points of the object in a second frame.

The detection of the feature points and the coordinate system are described now. FIG. 4 shows the feature points of the object 10 in a first frame. FIG. 5 shows the feature points of the object 10 in a second frame acquired at a timing after the first frame. Note that the first and second frames may be continuous frames or non-continuous frames. When the first and second frames are not continuous, a predetermined number of frames may be present between the first frame and the second frame.

Matching of the feature points between the first frame and the second frame can be done by, for example, pattern matching of the feature points between the first and second frames. The pattern matching in consideration of movements of the feature points and changes in the distance can be made possible by comparing images, even when the size of the object 10 changes or the object 10 moves between the first and second frames.

That is, in this embodiment, the feature points are extracted in order one by one from images of the plurality of frames. At this time, the same feature points can be detected by comparing the feature points detected up to the previous frame (a first frame) with feature points newly detected in the subsequent frame (a second frame) between adjacent frames, and pattern matching the feature points.

In FIG. 4, feature points are indicated by open dots and closed dots. The open dots indicate feature points CP1 which are present in the two-dimensional image of the first frame but are not present in the two-dimensional image of the second frame. The closed dots indicate feature points CP2 which are present in both the two-dimensional image of the first frame and the two-dimensional image of the second frame.

In FIG. 5, the feature points are indicated by closed dots and rectangles. The rectangles indicate feature points CP3 which are not present in the two-dimensional image of the first frame but are present in the two-dimensional image of the second frame.

When the posture of the object 10 changes between the first frame of FIG. 4 and the second frame of FIG. 5, the feature points CP2 are visible, the feature points CP1 are hidden, and the feature points CP3 newly appear. Note that as described above, the feature points CP2 are identified by pattern matching. The feature points can be accumulated by adding the feature points CP3 newly detected in the second frame to the known feature points CP1 and CP2 detected in the first frame in the coordinate system set for the object 10.

Figure 6:
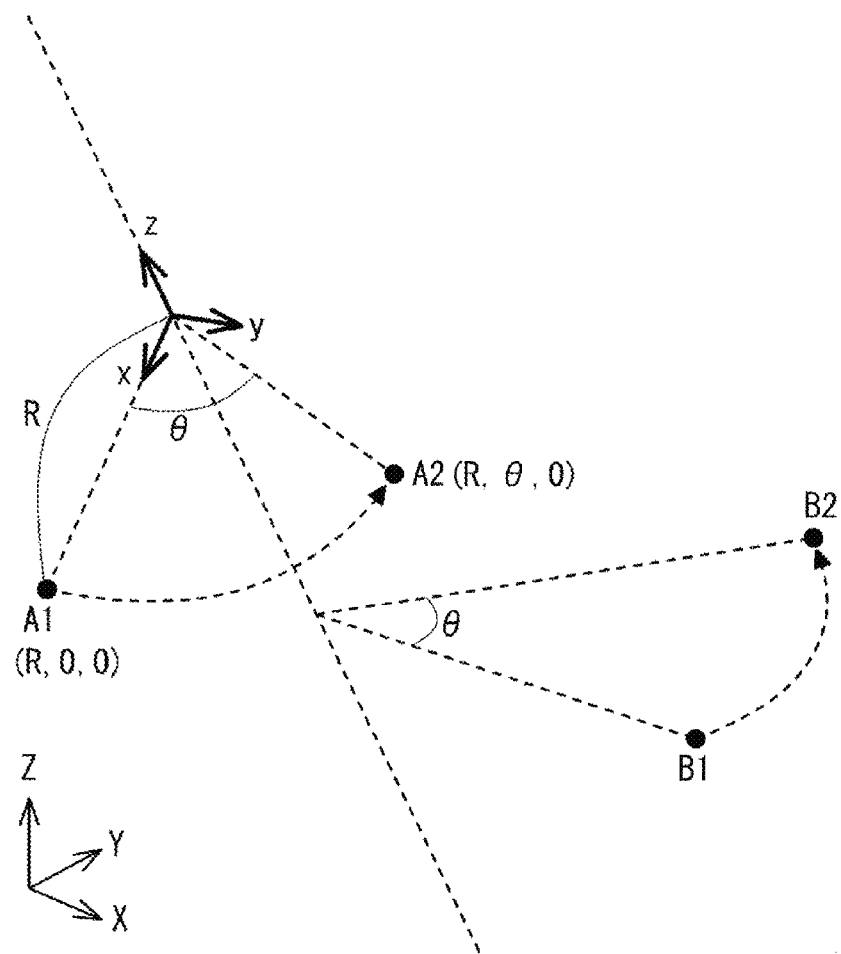
FIG. 6 is a view showing a coordinate system set for the object.

FIG. 6 is a view showing the coordinate system set for the object 10. It is assumed that two feature points A1 and B1 are present in the two-dimensional image and the distance image (the first frame) acquired at a first timing. In the two-dimensional image and the distance image (the second frame) acquired at a second timing, the feature point A2 corresponds to the feature point A1 of the first frame, and the feature point B2 corresponds to the feature point B1 of the first frame.

When the object 10 of the second frame is rotated by an angle θ around a certain rotation axis with respect to the object 10 of the first frame, a straight line to be the rotation axis is defined as a z axis (also referred to as "a first axis") of the coordinate system for the object 10. A point at which a plane including the feature point A1 (also referred to as a first feature point) and the feature point A2 (also referred to as a second feature point) intersects the z axis is set as an origin O under a condition that they are orthogonal to each other. The relationship between the coordinate system for the object 10 and the coordinates measured by the distance sensor unit 2 is that the z axis can be uniquely determined by the coordinates of the measurement system of the feature points A1, A2, B1, and B2. That is, a part where the plane formed by a set of points equidistant from the feature points A1 and A2 and the plane formed by a set of points equidistant from the feature points B1 and B2 overlap is a straight line, which represents the z axis. Therefore, the z axis can be determined when there are two feature points and two frames.

In this embodiment, a three-dimensional cylindrical coordinate system is used. That is, radial coordinates are set in a direction from the origin toward the feature point A1, and rotational coordinates are set in a rotational direction around the z axis. When a distance from the origin O to the feature points A1 and A2 is R, the coordinates of the feature point A1 are (R, 0, 0), and the coordinates of the feature point A2 are (R, θ, 0). In accordance with this, in the second frame, the coordinate system for the object 10 is also rotated around the z axis by θ so as to follow the movement of the object 10. As a result, the coordinates of the feature point A2 becomes (R, 0, 0) which are the same as the coordinates of the feature point A1 in the first frame, and thus the same coordinates can be maintained for the same feature point. Likewise, from the second frames onward, the coordinate system for the object 10 follows the movement of the object 10 to maintain the coordinates of each feature point.

When a three-dimensional orthogonal coordinate system is used, it is assumed that a line passing through the origin O and the feature point A1 is defined as an x axis (also referred to as a second axis). A line orthogonal to the x axis in the plane PL is defined as a y axis (also referred to as a third axis). Note that the initial feature point to be a reference can be any feature point.

As described above, a new feature point different from known feature points present in the first frame can be detected in the second frame. The new feature point is added by detecting the feature point for a plurality of frames, so that sufficient feature points necessary for acquiring the three-dimensional shape of the object 10 can be accumulated.

There may also be a known feature point which is present in the distance image of the first frame but which is hidden in the distance image of the second frame and have not been detected. In this case, information about the known feature point and the newly detected feature point can be saved on the same coordinate space in association with each other by converting the known feature point into a feature point in the second frame.

Figure 7:
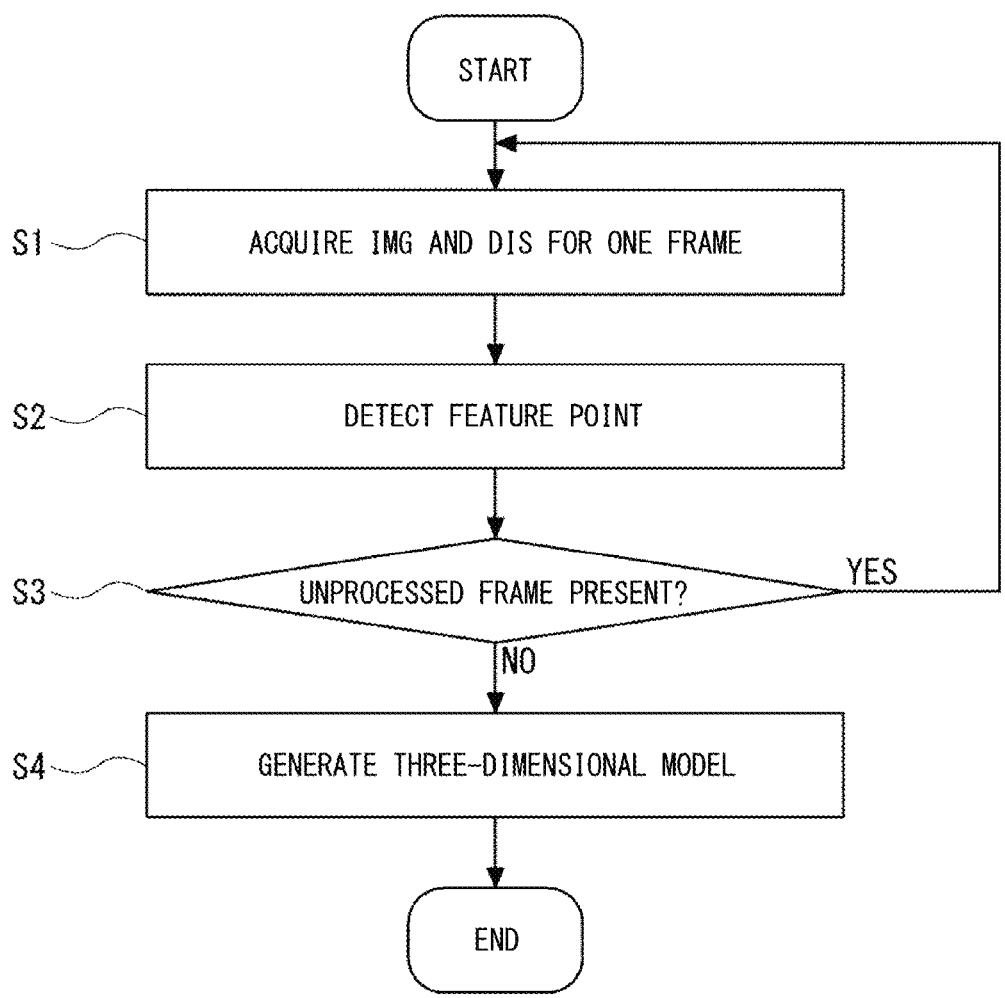
FIG. 7 is a flowchart showing an operation of the shape measuring apparatus according to the first embodiment.

Next, the shape measurement of the shape measuring apparatus 100 according to the first embodiment will be described. FIG. 7 is a flowchart showing an operation of the shape measuring apparatus 100 according to the first embodiment.

Step S1

The processing unit 15 reads a two-dimensional image for one frame from the two-dimensional image stored in the RAM 16. The two-dimensional image acquired here is referred to as IMG. Further, the processing unit 15 reads a distance image DIS corresponding to the image IMG from the distance image stored in the RAM 16. Here, the lateral direction of the read two-dimensional image is defined as an X direction, and the longitudinal direction thereof is defined as a Y direction. The distance image indicates a distance to the object 10 in the Z direction perpendicular to the X-Y plane.

Step S2

The processing unit 15 detects the feature points for one frame using the read two-dimensional image and distance image, and saves them in the RAM 16.

Step S3

The processing unit 15 determines whether there is a frame which has not been read among a plurality of frames used for the shape measurement. When there is a frame that has not been read, the process returns to Step S1.

Step S4

When there is no frame which has not been read, a three-dimensional model is generated based on the saved feature points. The three-dimensional model can be generated by associating the information of the two-dimensional image (luminance, color, etc. of pixels) of the same frame as that of the distance image with the distance image in which unnecessary points are eliminated in Steps S1 to S3.

Figure 8:
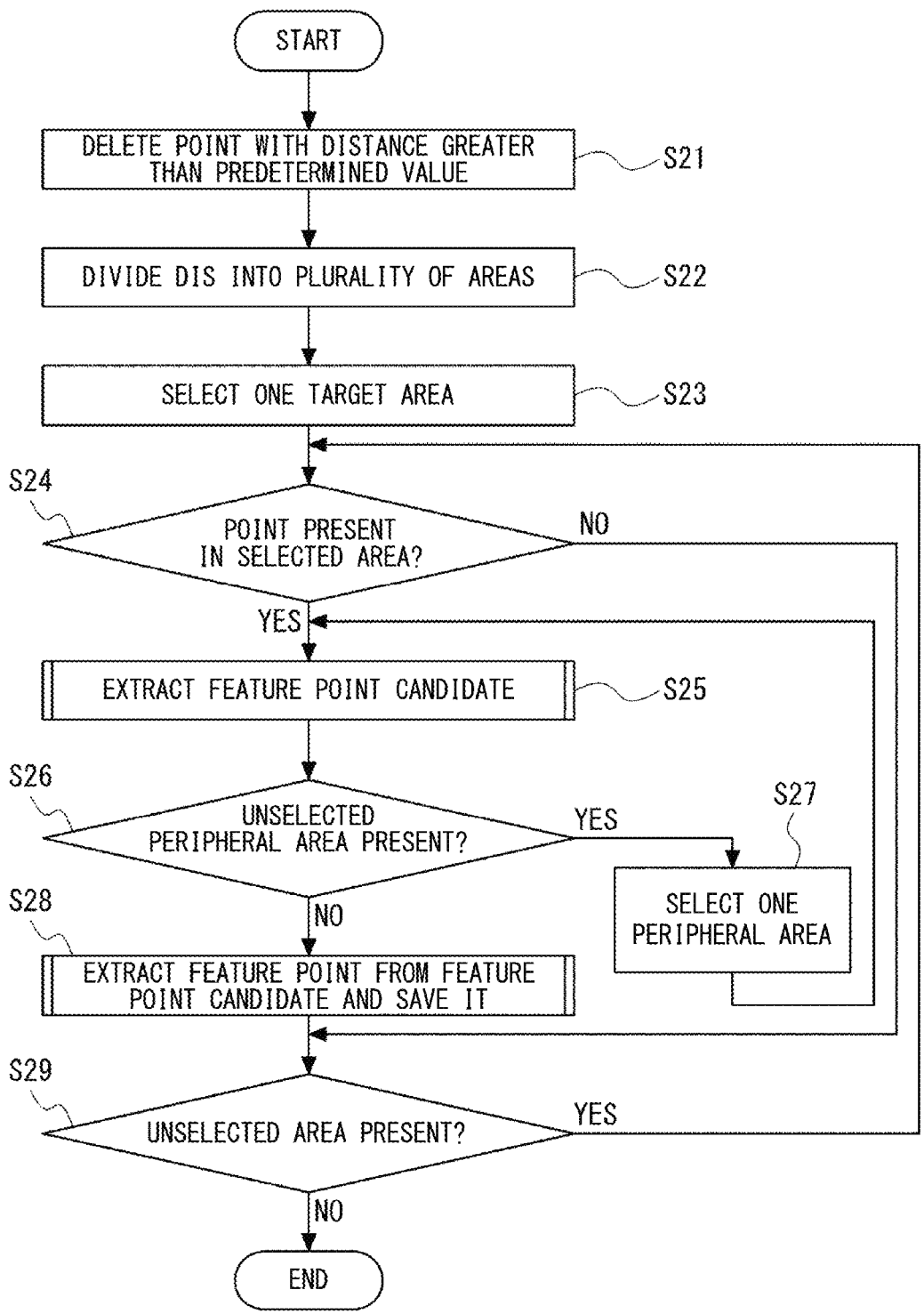
FIG. 8 is a flowchart showing feature point detection according to the first embodiment.

Next, the feature point detection in Step S2 will be described. FIG. 8 is a flowchart showing the feature point detection according to the first embodiment. In Step S2, the feature points are detected using the two-dimensional image and the distance image for one frame.

Step S21

Since the user's fingers and the like holding the object 10 are included in the distance image, the shape measuring apparatus detects the feature point of the user's fingers and the like. Thus, it is necessary to eliminate the feature points of the fingers and the like from data. In Step S21, such unnecessary data is deleted.

The recognition processing unit 15F refers to the distance image DIS and deletes, from the distance image DIS, a point whose distance indicated by the distance image DIS is larger than a predetermined value. Then, noise data caused by the background of the object 10 or the like is eliminated. Further, the recognition processing unit 15F deletes data such as a member or the user's hand holding the object 10 from the distance image DIS. This can be achieved by, for example, storing information about the shape and color of the member or the user's hand holding the object 10 in the storage unit 18 in advance and by the recognition processing unit 15F referring to this information. For example, when the user is wearing a glove of a specific color, pixels of the color of the glove may be deleted from the two-dimensional image IMG.

Alternatively, a method of measuring one surface of the object a plurality of times while changing the way of holding the object 10 may be employed. By doing so, it is possible to sort feature points into feature points that are detected a small number of times and feature points that are detected a large number of times. In this case, it can be determined that the feature points that are detected a small number of times are a holding body such as a finger holding the object 10. This is because there is little possibility that the same feature points appear on the same coordinates when the way of holding the object 10 is changed. Thus, unnecessary feature points can be deleted by performing measurement a plurality of times while changing the way of holding the object 10 and counting the number of times each feature point is detected.

Step S22

Figure 9:
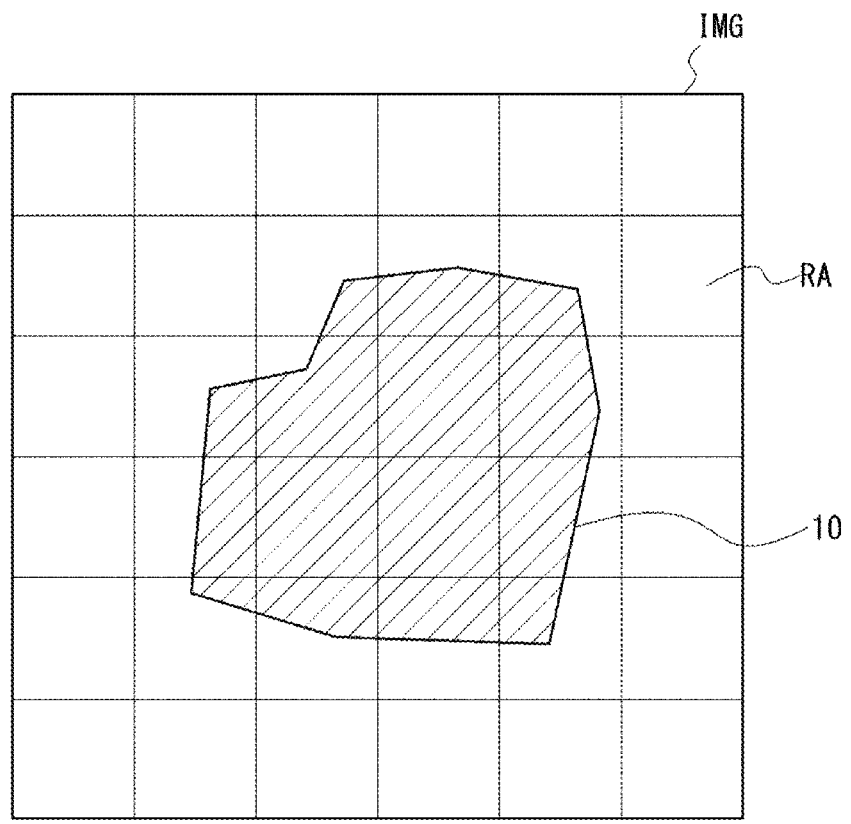
FIG. 9 is a view schematically showing division of a distance image.

The feature point detection unit 15G divides the distance image DIS into a plurality of areas RA. FIG. 9 schematically shows the division of the distance image DIS. As shown in FIG. 9, the distance image DIS is divided into, for example, a plurality of areas RA. In this example, the distance image DIS is divided into, for example, a plurality of rectangular areas.

Step S23

The feature point detection unit 15G selects a target area TA from the divided areas.

Step S24 The feature point detection unit 15G determines whether there is a point associated with the distance information of the distance image in the selected area.

Step S25

Figure 10:
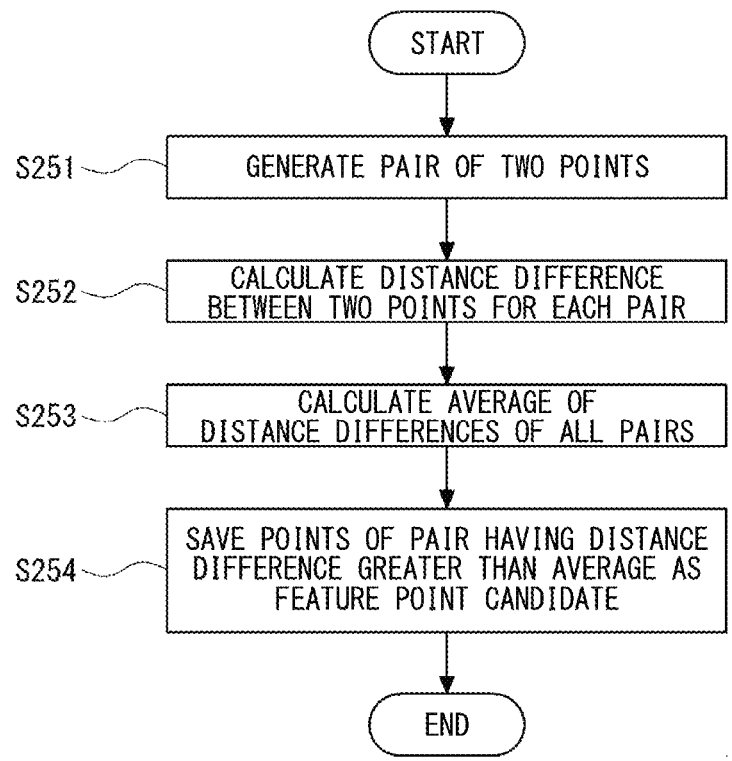
FIG. 10 is a flowchart showing extraction of a feature point candidate.

When there is a point associated with the distance information of the distance image in the selected area, the feature point detection unit 15G extracts a feature point candidate from the selected area. Hereinafter, the extraction of the feature point candidate in Step S25 will be described in detail. FIG. 10 is a flowchart showing the extraction of the feature point candidate in Step S25.

Step S251

When there are two points associated with the distance information of the distance image in the selected area, the feature point detection unit 15G generates all combinations p1 to pm of pairs each composed of two adjacent points (referred to as first pairs when the area is the target area or second pairs when the area is a peripheral area).

Step S252

The feature point detection unit 15G calculates a difference between the distance of one point and the distance of the other point for each of the pairs p1 to pm of two points.

Step S253

The feature point detection unit 15G calculates an average value of the distance differences between the pairs p1 to pm of two points.

Step S254

The feature point detection unit 15G stores, as the feature point candidate, a pair of two points having a distance difference larger than the calculated average value, for example, in the RAM 16.

Returning to FIG. 8, Steps S26 and subsequent steps will be described.

Step S26

Figure 11:
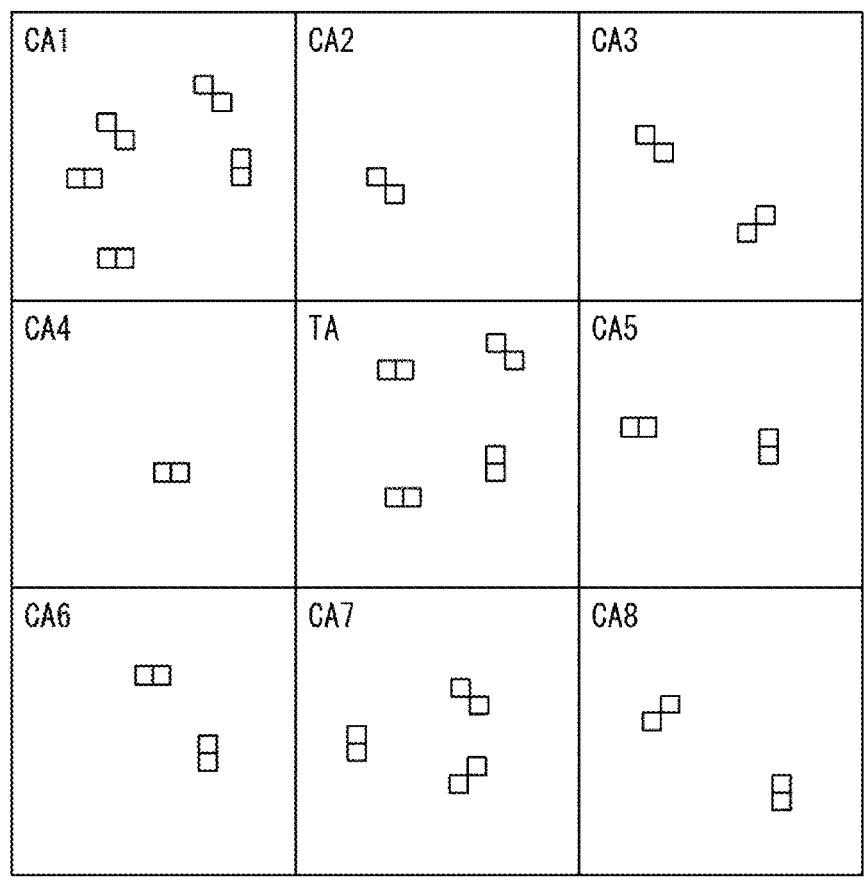
FIG. 11 is a view schematically showing a target area and a peripheral area.

The feature point detection unit 15G determines whether there is an unselected peripheral area among peripheral areas adjacent to the target area. FIG. 11 schematically shows the target area TA and peripheral areas CA1 to CA8.

Step S27

When there is an unselected peripheral area, the feature point detection unit 15G selects one peripheral area from the unselected peripheral area, and the process returns to Step S24. Then, in Step S25, a feature point candidate in the selected peripheral area is extracted.

Step S28

Figure 12:
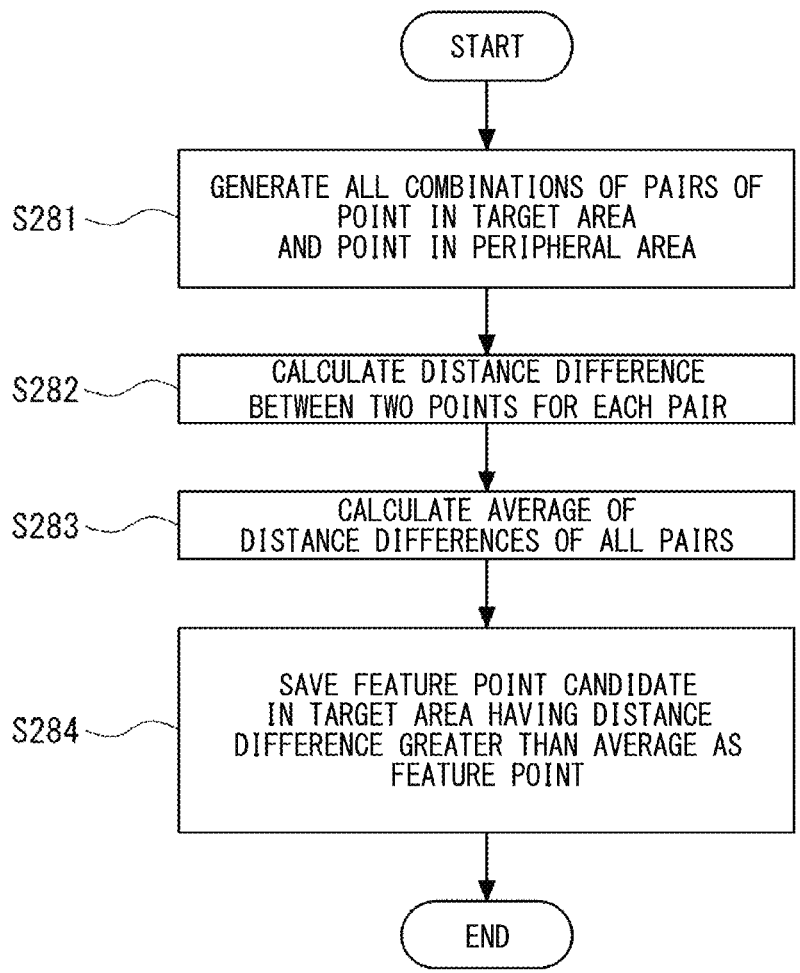
FIG. 12 is a flowchart showing feature point detection.

When there is no unselected peripheral area, that is, when all the peripheral areas have been selected, the feature point detection unit 15G detects the feature point from the feature point candidates in the target area TA and the peripheral areas. Hereinafter, the detection of the feature point in Step S28 will be described in detail. FIG. 12 is a flowchart showing the feature point detection in Step S28.

Step S281

All combinations of pairs of each of the points included in the feature point candidate of the target area and each of the points included in the feature point candidate of the peripheral area are generated (the pairs are also referred to as third pairs).

Step S282

The distance difference between two points included in each pair is calculated.

Step S283

An average value of the calculated distance differences of all the pairs is calculated.

Step S284

The feature point candidate of the target rectangular area included in the pair having a distance difference larger than the calculated average value is detected as a feature point. The detected feature point is saved in, for example, the RAM 16.

Returning to FIG. 8, Step S29 will be described.

Step S29

The feature point detection unit 15G determines whether there is an area which has not been selected as the target area among the plurality of areas.

When there is an area which has not been selected as the target area TA, the process returns to Step S23 to select another target area and continue detection of the feature point.

When there is no area which has not been selected as the target area, that is, when all the plurality of areas have been selected as the target area, the feature point detection is ended.

As described above, such a configuration enables the feature points for identifying the three-dimensional shape of the object to be detected using the coordinate system set for the object. As the coordinate system set for the object can be made to follow the movement of the object 10 between the frames, the positional relationship between known feature points and newly detected feature points can be accurately reflected and saved, even when the object moves.

By doing so, the feature points can be accurately detected even when the object is not fixed to a stage, a turning table, or the like, and instead is held by the user's hand and moves in a relatively complicated manner. Further, it is possible to more easily and efficiently measure the shape of the object without requiring a dedicated stage or turning table. Although the average value is calculated from the distance differences between the two points in each pair to make the comparison, a predetermined value may be determined in advance to compare a distance difference with the predetermined value.

Second Embodiment

In the first embodiment, the shape measurement of the object using the two-dimensional image and the distance image composed of a plurality of frames has been described. However, when the object 10 moves a small amount between the first frame and the second frame, the same feature points are detected at substantially the same positions in both frames, and only a few new feature points may be acquired or no new feature point may be acquired. In such a case, an effect of accumulating the feature points exerted on the resources required for the detection processing becomes small even when the feature points are detected in the second frame. Therefore, in this embodiment, it is preferable to selectively detect feature points when the object 10 moves such an amount that new feature points not detected in the first frame can be efficiently detected in the second frame.

Figure 13:
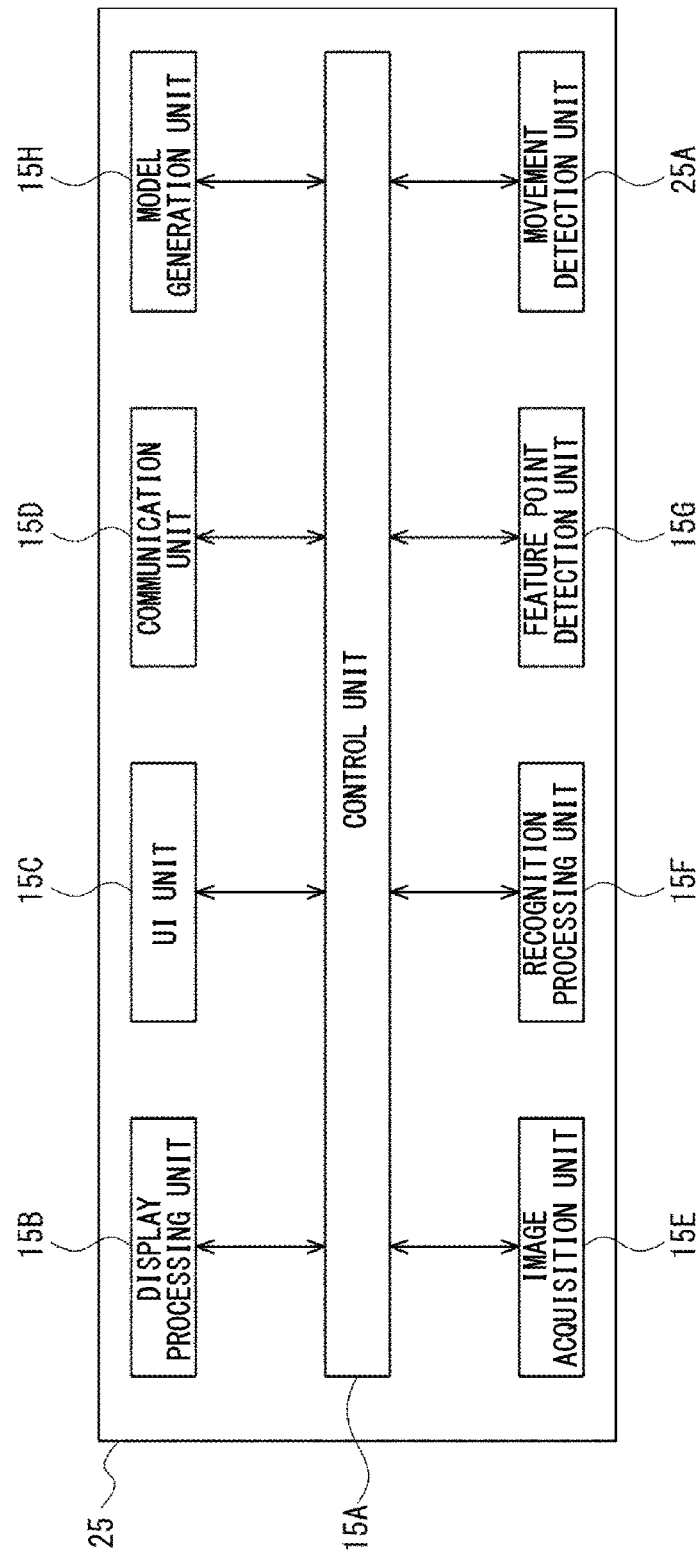
FIG. 13 is a view schematically showing a configuration of a processing unit according to a second embodiment.

A shape measuring apparatus according to a second embodiment will be described. The shape measuring apparatus according to the second embodiment has a configuration in which the processing unit 15 of the processing apparatus 5 of the shape measuring apparatus 100 according to the first embodiment is replaced with a processing unit 25. FIG. 13 schematically shows a configuration of the processing unit 25 according to the second embodiment. The configuration of the processing unit 25 is the same as that of the processing unit 15, except that it further includes a movement detection unit 25A.

The movement detection unit 25A calculates a difference between a distance image of the previous frame (a first frame) and a distance image of the subsequent frame (a second frame), and detects feature points in the subsequent frame (the second frame) according to the difference.

Figure 14:
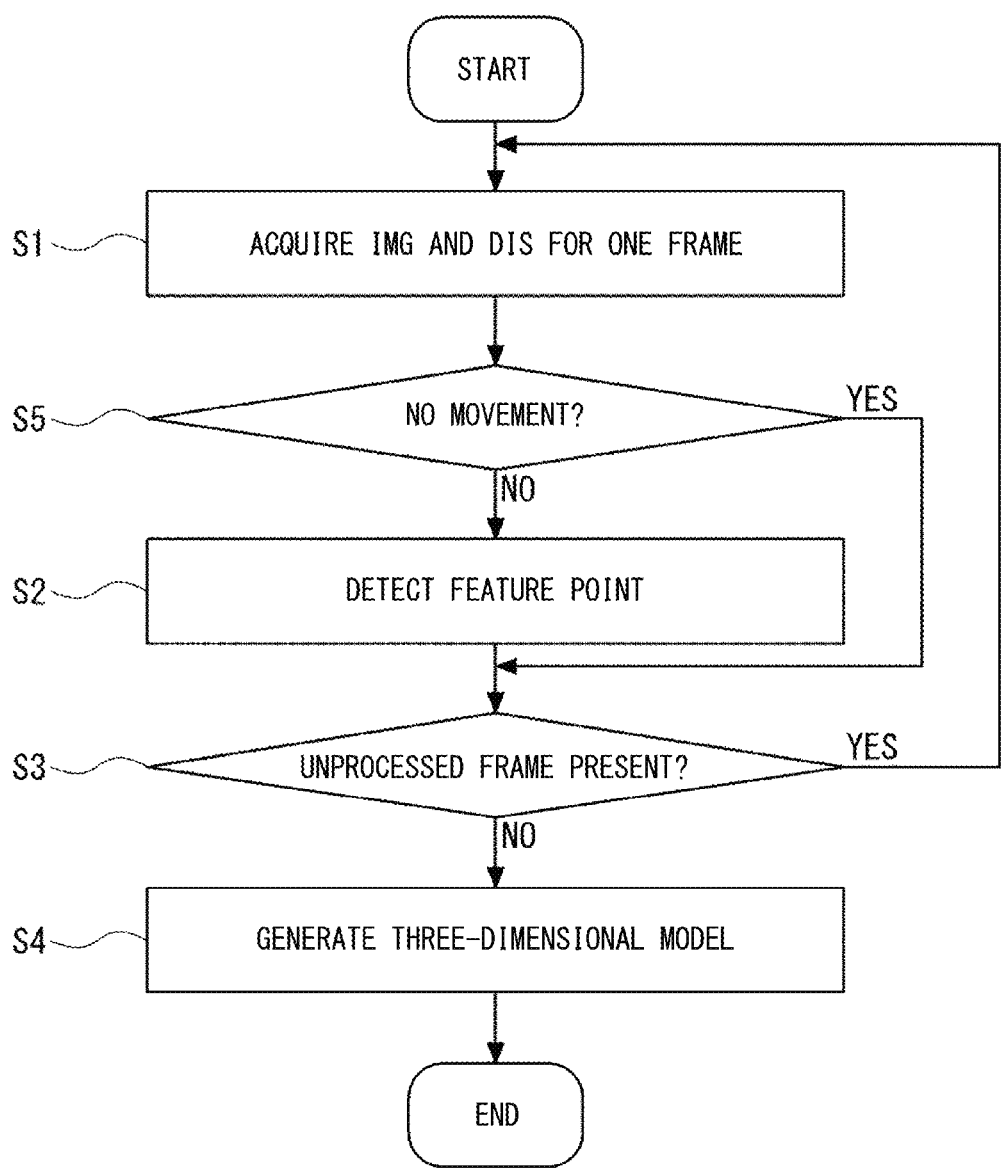
FIG. 14 is a flowchart showing an operation of the shape measuring apparatus according to the second embodiment.

FIG. 14 is a flowchart showing an operation of the shape measuring apparatus according to the second embodiment. As shown in FIG. 14, movement detection processing (Step S5) is inserted between Step S1 and Step S2.

Figure 15:
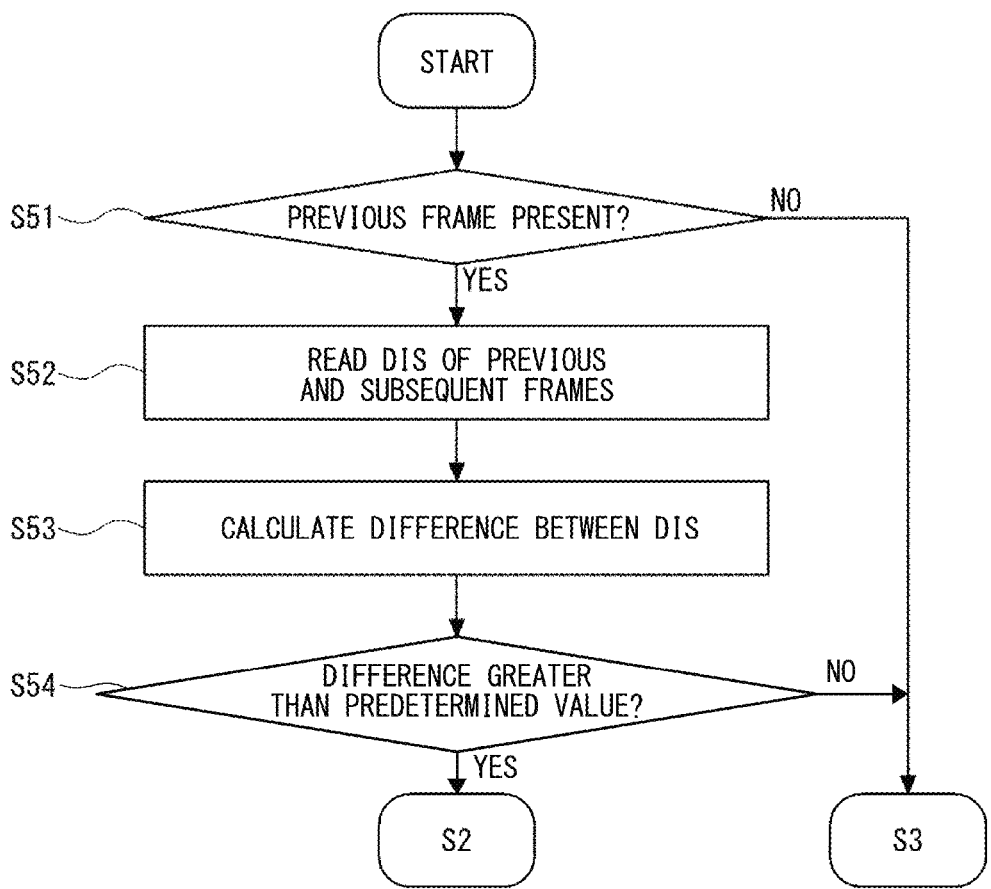
FIG. 15 is a flowchart showing movement detection processing.

The movement detection processing (Step S5) will be described. FIG. 15 is a flowchart showing the movement detection processing (Step S5).

Step S51

The movement detection unit 25A determines whether there is a frame (the first frame) that has been read the previous time. When there is no frame read the previous time (the first frame), the movement detection unit 25A ends the movement detection processing, because the distance images cannot be compared.

Then, the process proceeds to Step S3.

Step S52

When there is a frame read the previous time (the first frame), the movement detection unit 25A reads the distance image of the frame read the previous time (the first frame) from the RAM 16 and the distance image of the frame read after Step S1 (the second frame).

Step S53

The movement detection unit 25A calculates a difference between the distance image of the frame read the previous time (the first frame) and the distance image of the frame read after Step S1 (the second frame).

Step S54

The movement detection unit 25A determines whether the calculated difference is larger than a predetermined value. When the calculated difference is smaller than the predetermined value, the feature point detection (Step S2) is skipped, and the process proceeds to Step S3. When the calculated difference is smaller than the predetermined value, the process proceeds to the feature point detection (Step S2). When the calculated difference is equal to the predetermined value, the process may proceed to Step S2 or to Step S3.

As described above, when there is no significant movement in the object, the feature point detection may be skipped. By doing so, it is not necessary to perform unnecessary processing, thereby shortening the overall processing time of the feature point detection processing for a plurality of frames.

Third Embodiment

Next, a shape measuring apparatus according to a third embodiment will be described. In the first and second embodiments, generation of a three-dimensional model based on detected feature points has been described. The shape measuring apparatus according to this embodiment is configured to include a function of automatically dividing a generated three-dimensional model into a plurality of parts.

Figure 16:
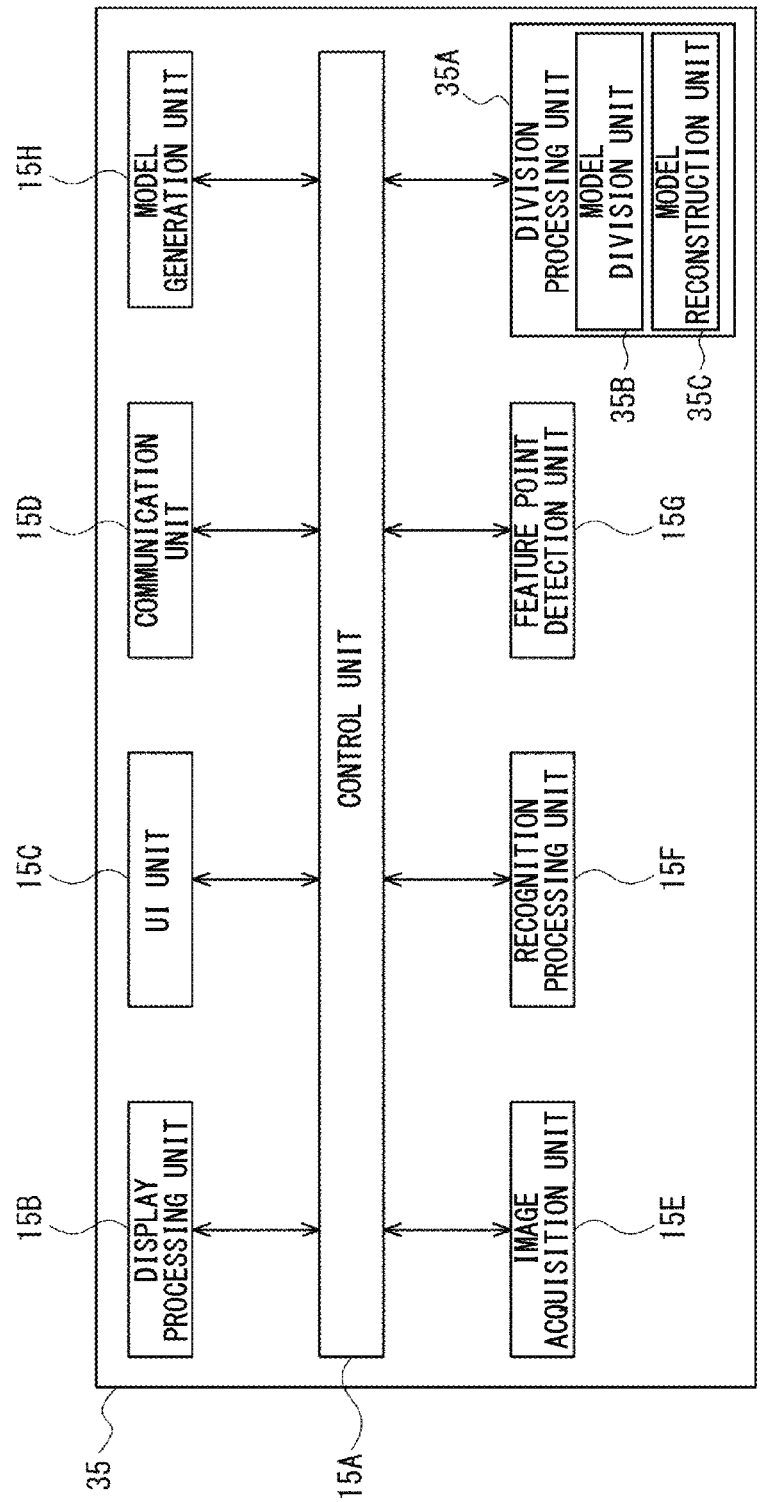
FIG. 16 schematically shows a configuration of a processing unit according to a third embodiment.

A shape measuring apparatus according to the third embodiment will be described. The shape measuring apparatus according to the third embodiment has a configuration in which a processing unit 15 of the processing apparatus 5 of the shape measuring apparatus 100 according to the first embodiment is replaced with a processing unit 35. FIG. 16 schematically shows a configuration of the processing unit 35 according to the third embodiment. The configuration of the processing unit 35 is the same as that of the processing unit 15 except that it further includes a division processing unit 35A.

The division processing unit 35A performs processing of dividing the three-dimensional model generated in Step S4. The division processing unit 35A includes a model division unit 35B and a model reconstruction unit 35C. The model division unit 35B refers to cross sections of the three-dimensional model and divides the three-dimensional model at a position where the cross section becomes smaller than a predetermined value. The model reconstruction unit 35C reconstructs the three-dimensional model as a collection of parts divided by the model division unit 35B.

Figure 17:
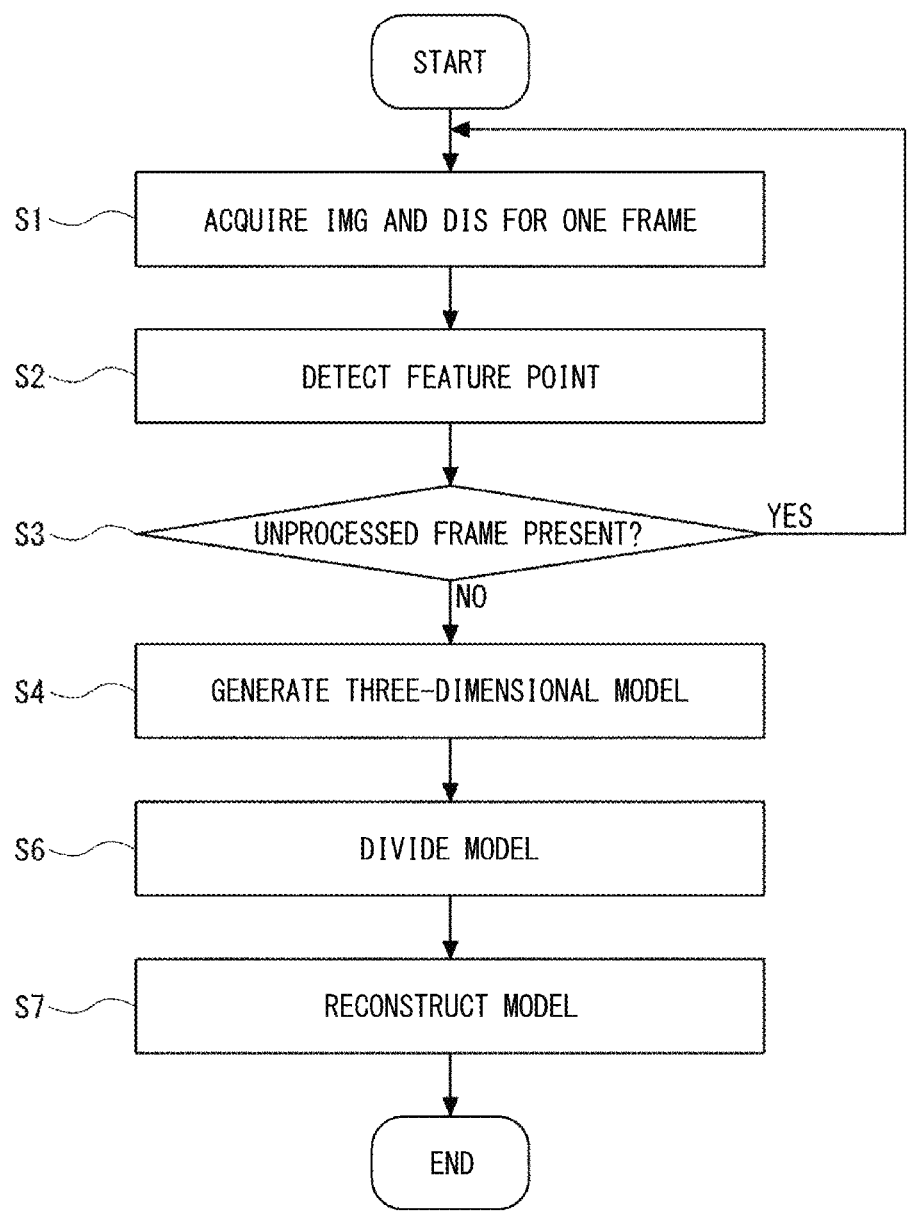
FIG. 17 is a flowchart showing an operation of the shape measuring apparatus according to the third embodiment.

FIG. 17 is a flowchart showing an operation of the shape measuring apparatus according to the third embodiment. As shown in FIG. 17, model division (Step S6) and model reconstruction (Step S7) are added after the generation of the three-dimensional model (Step S4). Steps S1 to S4 are the same as those in the first embodiment, and thus the descriptions thereof will be omitted.

Step S6

Figure 18:
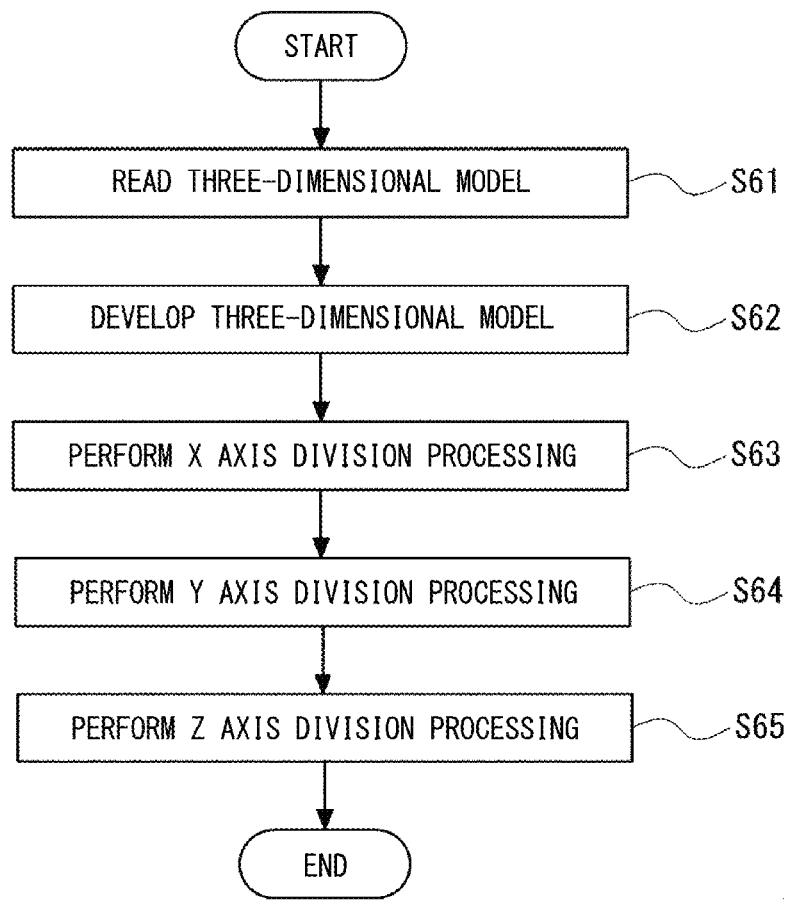
FIG. 18 is a flowchart showing model division processing.

As described above, the model division unit 35B refers to the cross sections of the three-dimensional model and divides the three-dimensional model at the position where the cross section becomes smaller than the predetermined value. Step S6 will be described below. FIG. 18 is a flowchart showing the processing in Step S6.

Step S61

The model division unit 35B reads the three-dimensional model from the RAM 16.

Step S62

The model division unit 35B develops the read three-dimensional model in a virtual three-dimensional orthogonal coordinate system.

Step S63

Figure 19:
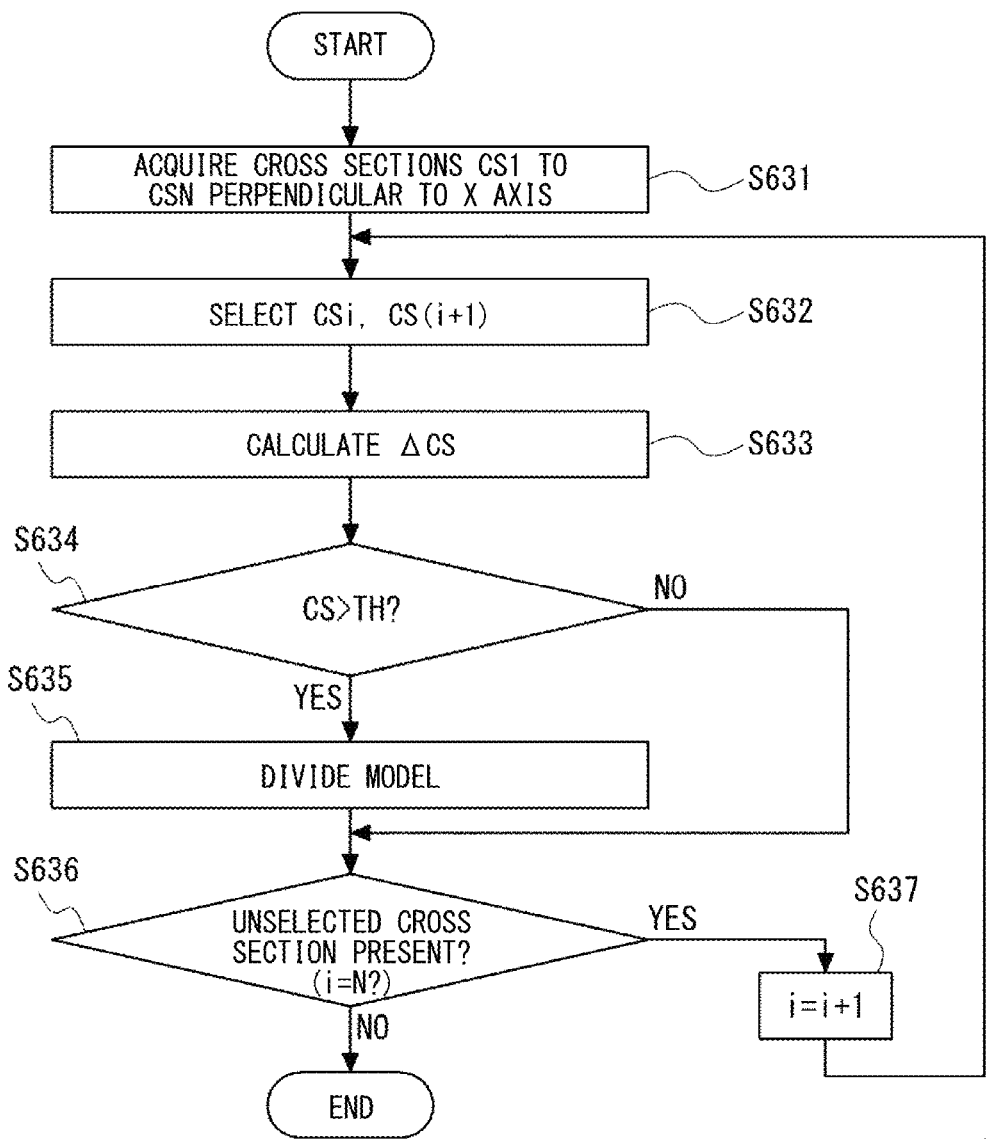
FIG. 19 is a flowchart showing division processing by a cross section perpendicular to an X axis.

The model division unit 35B performs processing of dividing the three-dimensional model on a plane perpendicular to the X axis. Step S63 will be described below. FIG. 19 is a flowchart showing the processing in Step S63.

Step S631

A plurality of cross sections of the three-dimensional model separated by a predetermined pitch on the X axis are acquired. For example, a plurality of cross sections are acquired from the cross section with the smallest X coordinates to the cross section with the largest X coordinates. When the number of acquired cross sections is N (N is an integer of three or more), the first to Nth cross sections CS1 to CSN are acquired.

Step S632

A pair of two adjacent cross sections is sequentially selected from the acquired plurality of cross sections. Here, a cross section CSi and a cross section CS (i+1) are selected. Further, i is an integer of three or more and N or less. Note that an initial value of i is 1.

Step S633

A cross-sectional area difference ΔCS between an area of the cross section CSi and an area of the cross section CS (i+1) of the three-dimensional model is calculated.

Step S634

It is determined whether the calculated cross-sectional area difference ΔCS of the three-dimensional model is larger than a predetermined value TH (ΔCS>TH). When the difference ΔCS between the cross-sectional areas is smaller than the predetermined value TH, the process proceeds to Step S636.

Step S635

When the calculated cross-sectional area difference ΔCS of the three-dimensional model is larger than the predetermined value TH, the three-dimensional model is divided by the cross section having a smaller cross-sectional area.

Step S636

It is determined whether there is an unselected cross section among the acquired plurality of cross sections. Specifically, it is determined whether i=N. When there is no unselected pair of cross sections (i=N), the division of the three-dimensional model is ended.

Step S637

When there is a pair of unselected cross sections (i<N), it is necessary to change the cross section to be selected. In this case, i is incremented by one, and the process returns to Step S632.

Step S64

Figure 20:
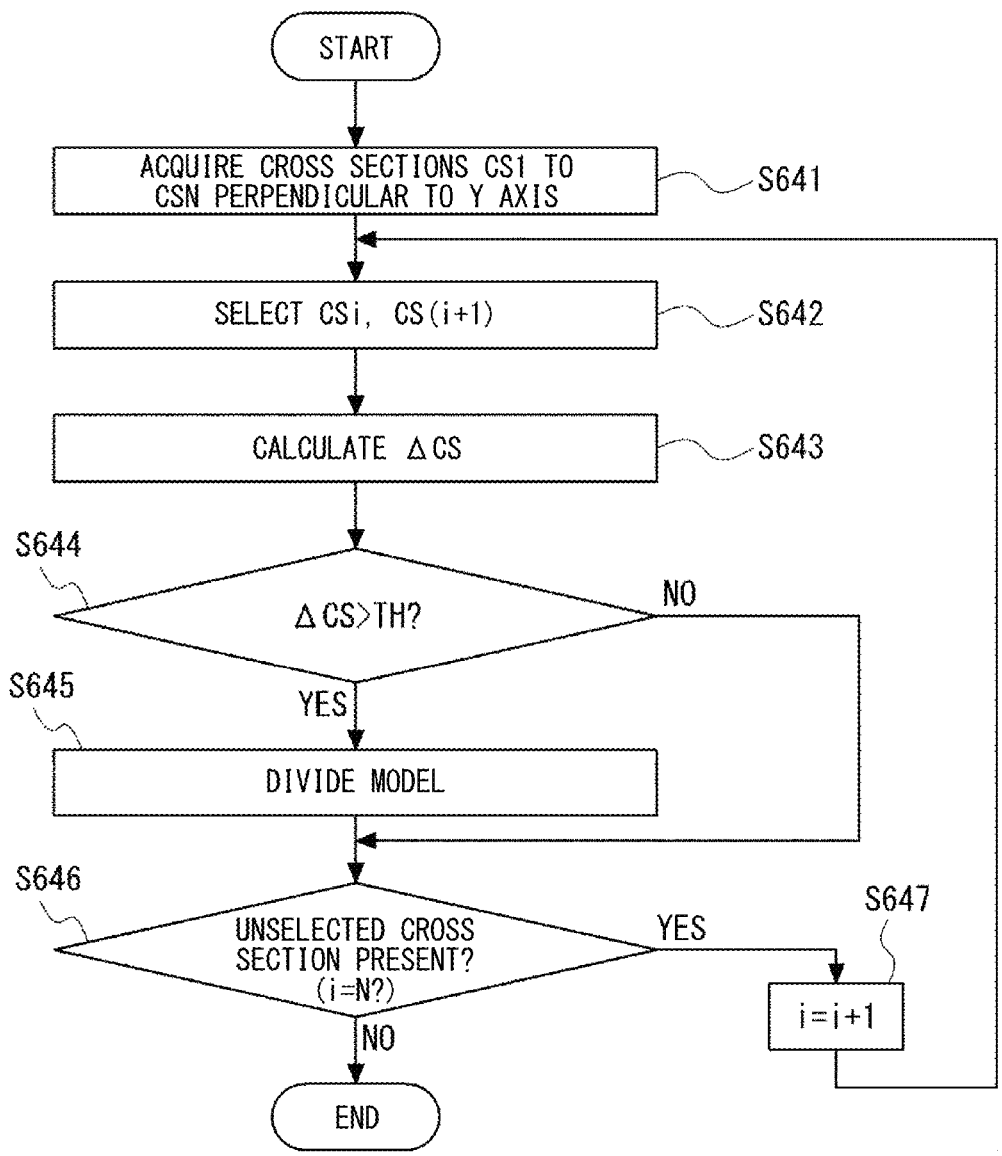
FIG. 20 is a flowchart showing division processing by a cross section perpendicular to a Y axis.

The model division unit 35B performs processing of decomposing the three-dimensional model by a plane perpendicular to the Y axis. Step S64 will be described below. FIG. 20 is a flowchart showing the processing in Step S64.

Steps S641 to S648 are the same as Steps S631 to S638 of FIG. 19, respectively, except that the X axis is changed to the Y axis, and thus detailed descriptions thereof will be omitted.

Step S65

Figure 21:
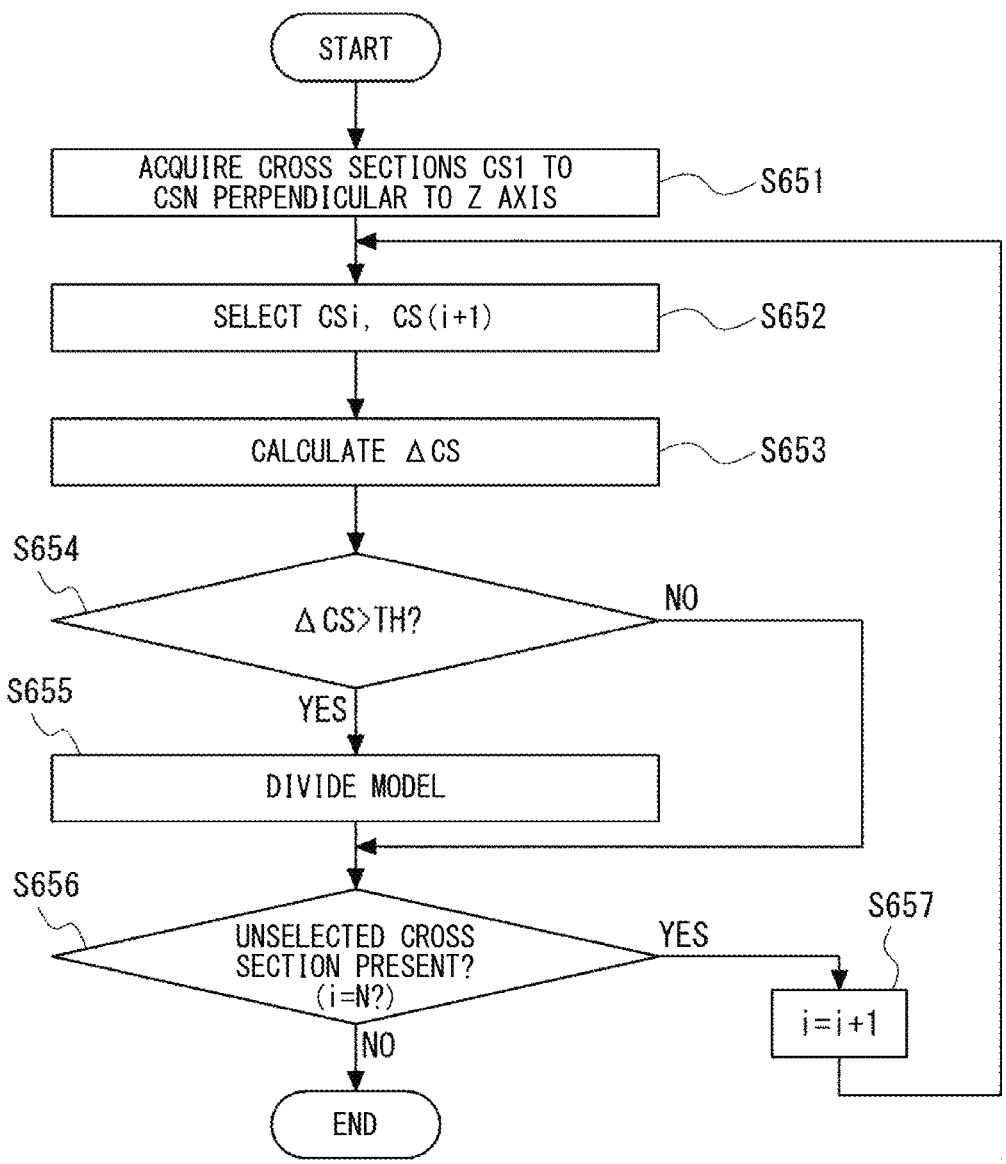
FIG. 21 is a flowchart showing division processing by a cross section perpendicular to a Z axis.

The model division unit 35B performs processing of decomposing the three-dimensional model nu a plane perpendicular to the Z axis. Step S65 will be described below. FIG. 21 is a flowchart showing the processing in Step S65.

Steps S651 to S658 are the same as Steps S631 to S638 of FIG. 19, respectively, except that the X axis is changed to the Z axis, and thus detailed descriptions thereof will be omitted.

The three-dimensional model can be divided through the above processing at positions where the areas of the cross sections perpendicular to the respective axes greatly change, that is, at the narrowed position.

Returning to FIG. 17, Step S7 will be described.

Step S7

The model reconstruction unit 35C concatenates the three-dimensional models divided in Step S6 and reconstructs the three-dimensional model as a collection of the divided parts.

As described above, the shape measuring apparatus according to this embodiment can automatically divide the three-dimensional model into a plurality of parts according to predetermined values set in Steps S64 to S66. Note that the predetermined values used in Steps S64 to S66 may be the same or different.

Figure 22:
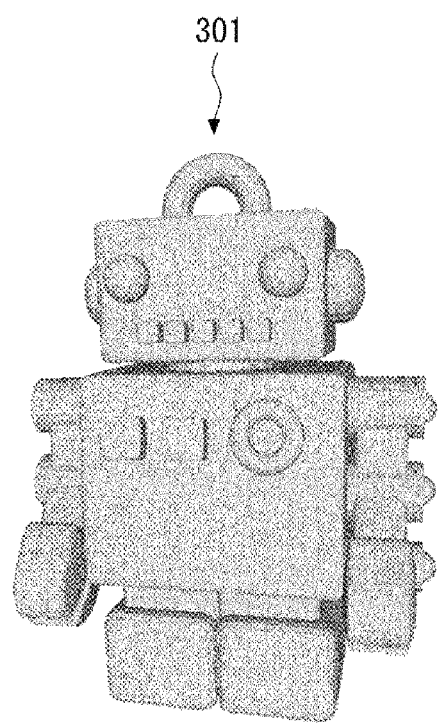
FIG. 22 is a view showing an example of a three-dimensional model before division.
Figure 23:
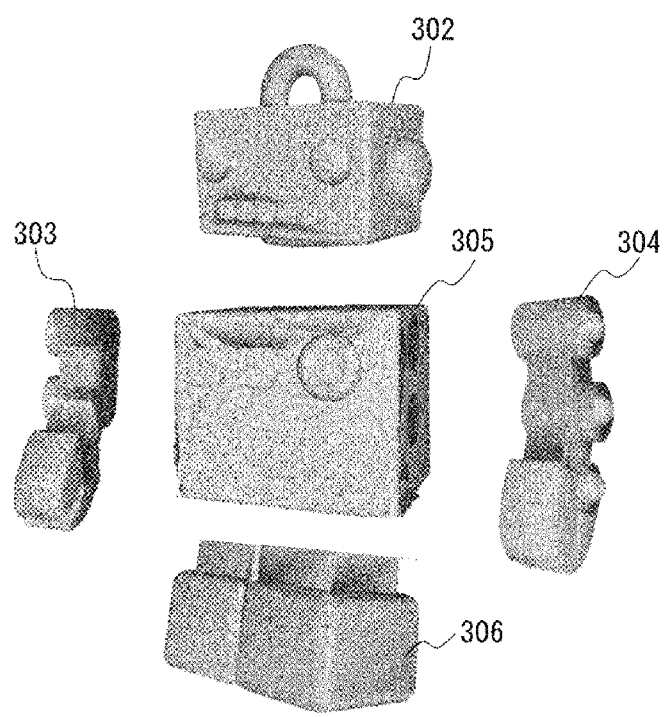
FIG. 23 is a view showing an example of a divided three-dimensional model.

Here, an example of the division of the three-dimensional model will be described. FIG. 22 shows an example of the three-dimensional model before division. FIG. 23 shows an example of the divided three-dimensional model. As shown in FIG. 23, a three-dimensional model 301 of a human-shaped toy before division of FIG. 22 is divided into a head part 302, a right arm part 303, a left arm part 304, a body part 305, and leg part 306. In FIG. 23, in order to clarify that the three-dimensional model is divided, the head part 302, the right arm part 303, the left arm part 304, the body part 305, and the leg part 306 are displayed separately from one another.

Figure 24:
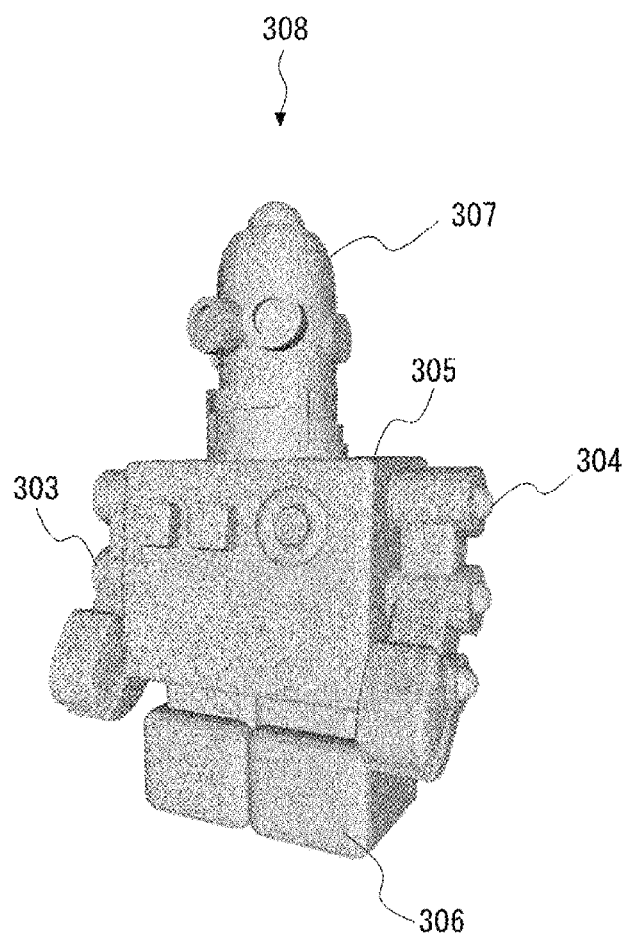
FIG. 24 shows an example in which a head part of the three-dimensional model is replaced.

When the three-dimensional model is divided, each of the divided parts can be independently processed, which makes it possible to easily change or replace a specific part. FIG. 24 shows an example in which the head part of the three-dimensional model of FIG. 22 is replaced. In this example, the head part 302 of the three-dimensional model 301 is replaced with another head part 307, so that the three-dimensional model 301 becomes a three-dimensional model 308. In this manner, the design of the three-dimensional model can be easily changed by replacing a part of the three-dimensional model such as the head part and reconstructing the divided model. Therefore, it is possible to efficiently design the model.

Note that the model division (Step S6) may be performed not only once but may be repeatedly performed a plurality of times. For example, each of the parts divided in the first model division may be divided again using smaller values than those set for the predetermined value TH used in Steps S634, S644, and S654 in the first model division. Then, each part can be divided into a plurality of smaller parts.

The three-dimensional model to be divided may not only be the three-dimensional models generated in the first and second embodiments but also any three-dimensional model.

Other Embodiments

Note that the present disclosure is not limited to the above-described embodiments, and can be appropriately changed without departing from the spirit of the present disclosure. For example, the movement detection processing in Step S5 shown in FIG. 14 may be included in the operation of the shape measuring apparatus of FIG. 17.

In the above embodiments, the present disclosure has been described as a hardware configuration, but the present disclosure is not limited to this. In the present disclosure, for example, control of a processing unit included in a processing apparatus can be achieved by causing a CPU (Central Processing Unit) to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first to third embodiments can be combined as desirable by one of ordinary skill in the art.

What is claimed is:

1. A shape measuring apparatus comprising:
   an imaging unit configured to acquire a two-dimensional image of an object over a plurality of frames, the object being held by a hand of a user of the shape measuring apparatus;
   a distance image sensor unit configured to acquire a distance image of the object over the plurality of frames, the distance image of the object being three-dimensional point cloud data including coordinates of pixels on a two-dimensional plane and the distances at the coordinates;
   a processing apparatus configured to detect a feature point of the object from the distance image of each of the plurality of frames that has been acquired by the user moving the object, to write the detected feature point in a coordinate system set for the object, and to delete data of the hand of the user from the distance image of the object; and
   a division processing unit configured to divide a three-dimensional model obtained from the distance image, wherein
   the processing apparatus deletes the feature point that has been detected a small number of times as the hand of the user from the data that has been acquired by performing a plurality of detections while the user changes a holding position of the object, and
   the division processing unit obtains an area of a cross-section of the three-dimensional model sequentially selected at a predetermined pitch along a predetermined axis and divides the three-dimensional model by either of a currently selected cross-section or an adjacent cross-section selected just before the currently selected cross-section when an area difference between the currently selected cross-section and the adjacent cross-section is larger than a predetermined threshold value
   wherein at least one predetermined threshold value in three predetermined threshold values respectively corresponding to the three axes is different from the other predetermined threshold values.

2. The shape measuring apparatus according to claim 1, wherein the processing apparatus
   detects rotation of the object between a first frame and a second frame which are included in the plurality of frames and sets a rotation axis of the rotation as a first axis of the coordinate system,
   sets a plane including a first feature point present in the distance image of the first frame and a second feature point corresponding to the first feature point in the distance image of a second frame which is different from the first frame,
   sets a point where the plane intersects with the first axis as an origin of the coordinate system,
   sets a radial coordinate in a direction from the origin toward the first feature point, and
   sets a rotational coordinate in a rotational angle direction around the first axis.

3. The shape measuring apparatus according to claim 1, wherein the processing apparatus
   detects rotation of the object between a first frame and a second frame which are included in the plurality of frames and sets a rotation axis of the rotation as a first axis of the coordinate system,
   sets a plane including a first feature point present in the distance image of the first frame and a second feature point corresponding to the first feature point in the distance image of a second frame which is different from the first frame,
   sets a point where the plane intersects with the first axis as an origin of the coordinate system,
   sets a line passing through the origin and the first feature point as a second axis of the coordinate system, and
   sets a line orthogonal to the second axis on the plane as a third axis of the coordinate system.

4. The shape measuring apparatus according to claim 2, wherein the processing apparatus comprises:
   an image acquisition unit configured to read the distance image;
   a recognition processing unit configured to perform processing of referring to the distance image and deleting a point having a distance to the object larger than a predetermined value; and a feature point detection unit configured to detect the feature point from the distance image processed by the recognition processing unit.

5. The shape measuring apparatus according to claim 4, wherein the feature point detection unit
- divides the distance image from one frame processed by the recognition processing unit into a plurality of areas,
- selects a target area from the plurality of areas,
- generates all combinations of first pairs each composed of adjacent two points from among points in the target area,
- extracts, as a feature point candidate, the first pair having a difference between a distance from one of the two points to the object and a distance from the other point to the object larger than a predetermined value,
- generates all combinations of second pairs each composed of a point in the region peripheral to the target area and an adjacent point,
- extracts, as a feature point candidate, the second pair having a difference between a distance from one of the two points to the object and a distance from the other point to the object larger than a predetermined value,
- generates all combination of third pairs each composed of each point included in the first pair extracted as the feature point candidate and each point included in the second pair extracted as the feature point candidate, and
- detects, as the feature point, the point of the first pair included in the third pair having a difference between a distance from one of the two points to the object and a distance from the other point to the object larger than a predetermined value.

6. The shape measuring apparatus according to claim 4, wherein the processing apparatus further comprises:
- a movement detection unit configured to calculate a difference between the distance image of the first frame and the distance image of the second frame and detect a movement of the object when the difference is larger than a predetermined value, and
- the feature point detection unit configured to detect, when the movement detection unit detects the movement of the object, the feature point from the distance image of the second frame.

7. A shape measuring method comprising:
- causing an imaging unit to acquire a two-dimensional image of an object over a plurality of frames, the object being held by a hand of a user that performs a measurement;
- causing a distance image sensor unit to acquire a distance image of the object over the plurality of frames, the distance image of the object being three-dimensional point cloud data including coordinates of pixels on a two-dimensional plane and the distances at the coordinates;
- causing a processing apparatus to:
  - detect a feature point of the object from the distance image of each of the plurality of frames that has been acquired by the user moving the object;
  - write the detected feature point in a coordinate system set for the object; and
  - delete data of the hand of the user from the distance image of the object; and
- causing a division processing unit to divide a three-dimensional model obtained from the distance image, wherein
- the processing apparatus deletes the feature point that has been detected a small number of times as the hand of the user from the data that has been acquired by performing a plurality of detections while the user changes a holding position of the object, and
- the division processing unit obtains an area of a cross-section of the three-dimensional model sequentially selected at a predetermined pitch along a predetermined axis and divides the three-dimensional model by either of a currently selected cross-section or an adjacent cross-section selected just before the currently selected cross-section when an area difference between the currently selected cross-section and the adjacent cross-section is larger than a predetermined threshold value
- wherein at least one predetermined threshold value in three predetermined threshold values respectively corresponding to the three axes is different from the other predetermined threshold values.

8. A non-transitory computer readable medium storing a shape measuring program that causes a computer to execute:
- acquiring a two-dimensional image of an object over a plurality of frames, the object being held by a hand of a user that performs a measurement;
- acquiring a distance image of the object over the plurality of frames, the distance image of the object being three-dimensional point cloud data including coordinates of pixels on a two-dimensional plane and the distances at the coordinates;
- detecting a feature point of the object from the distance image of each of the plurality of frames that has been acquired by the user moving the object;
- writing the detected feature point in a coordinate system set for the object;
- deleting data of the hand of the user from the distance image of the object;
- dividing a three-dimensional model obtained from the distance image, wherein
- the feature point that has been detected a small number of times is deleted as the hand of the user from the data that has been acquired by performing a plurality of detections while the user changes a holding position of the object, and
- an area of a cross-section of the three-dimensional model sequentially selected at a predetermined pitch along a predetermined axis is obtained and the three-dimensional model is divided by either of a currently selected cross-section or an adjacent cross-section selected just before the currently selected cross-section when an area difference between the currently selected cross-section and the adjacent cross-section is larger than a predetermined threshold value
- wherein at least one predetermined threshold value in three predetermined threshold values respectively corresponding to the three axes is different from the other predetermined threshold values.

9. The shape measuring apparatus according to claim 1, wherein the predetermined axis is any one of three axes of a three-dimensional orthogonal coordinate system.

10. The shape measuring apparatus according to claim 1, wherein the division processing unit obtains a plurality of the areas of the cross-sections from the minimum value to the maximum value along the predetermined axis of the three-dimensional model.

11. The shape measuring apparatus according to claim 1, wherein the cross-section by which the three-dimensional model is divided is one cross-section in the currently selected cross-section and the adjacent cross-section that has a smaller area.

12. The shape measuring apparatus according to claim 1, wherein
  the division processing unit comprises model reconstruction unit, and
  the model reconstruction unit concatenates the divided three-dimensional models and reconstructs the three-dimensional model as a collection of divided parts.

* * * * *